UNITED STATES PATENT OFFICE.

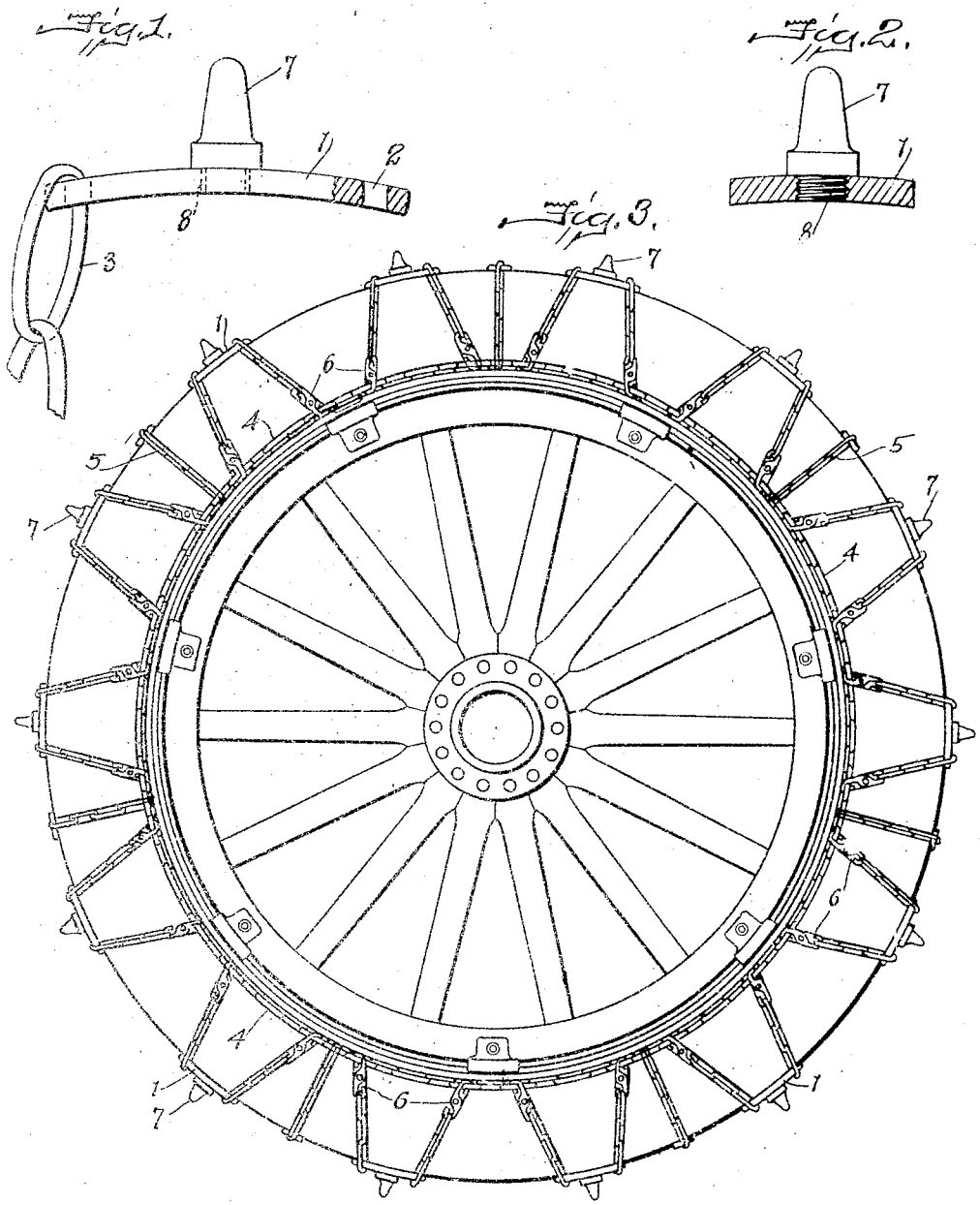

CHARLES M. SMITH, OF GREENFIELD, OHIO, ASSIGNOR OF ONE-HALF TO A. E. BALLENTINE, OF GREENFIELD, OHIO.

ANTISKID DEVICE.

1,403,982.  Specification of Letters Patent.  Patented Jan. 17, 1922.

Application filed September 25, 1920. Serial No. 412,830.

*To all whom it may concern:*

Be it known that I, CHARLES M. SMITH, a citizen of the United States, residing at Greenfield, in the county of Highland and State of Ohio, have invented certain new and useful Improvements in Antiskid Devices, of which the following is a specification, reference being had therein to the accompanying drawing.

My invention relates to anti-skid devices and in particular to devices for use on heavy automotive equipment, such as trucks.

The object of my invention is to provide a mechanism readily applied to the wheels of automotive vehicles for use during periods of ice and snow and very heavy mud. It is an object of my invention to provide a mechanism which will supplement the ordinary chains now in use on automotive equipment to prevent skidding.

It is an object of the invention to provide a device wherein the calk or anti-skid element may be removed when worn out or may be removed for the placing of a different type or a different size of calk.

I have found in practice that it may be useful to attach this anti-skid device directly to the wheel or it may be useful to attach it to the existing chains. In case the vehicle is stuck in the mud or ice, my device can be applied while standing on the running board, as it can be easily locked onto the chains already on the wheel.

Due to the very heavy character of the work to which mechanism embodying my invention is subjected, it is quite essential that the projecting portion or calk can be renewed. It is possible to do this in my invention while it is still on the tire without removing the mechanism itself, by simply unscrewing the calk with a pair of pliers.

Referring to the drawings:

Fig. 1 is a side elevation of the plate and calk with a portion of one of the chains attached;

Fig. 2 is an end elevation with the plate in section; and

Fig. 3 is a side elevation of a wheel, tire, chains and a plurality of my devices attached thereto.

Referring to the drawings, and in particular to Fig. 1, 1 is a plate having a plurality of apertures 2 therein for the attachment of the diagonal chains 3. The use of the word "diagonal" is purely for the matter of convenience of description in the present instance to distinguish these chains from the lateral chains that run around the wheel, as at 4, and the cross chains, as at 5, (Fig. 3). The chains 3 are attached to the chains 4 by a suitable link or lock 6. This lock may be of any desired kind or character.

It will be observed that the plate 1 is curved to fit the curvature of the tire. The plate is usually longer in the direction of longitudinal axis of the tire than its width, as witness Fig. 2.

In this plate 1 is located a calk 7. This calk is attached to the plate at 8 and usually is screwed into it, as shown in Fig. 2. This calk can be changed in size, shape or form to suit the various conditions of work. When worn out or broken, it may be readily unscrewed with a pair of pliers and a fresh one substituted. This gives long life to my device, ease of replacement and facilitates the adjustment of it, even on the tire, to varying conditions of work.

This is particularly useful in connection with trucks on long hauls between cities where extreme conditions of roadway and weather are encountered.

My device can be used with existing types of chains or without them. If the chains are already on the vehicle and it becomes stuck in the mud or ice, my device can be readily attached without the operator getting out into the mud. Again, if the wheel is stuck in the mud or in a rut I can apply my device to that portion of the wheel which is free, an advantage which is not possible with the ordinary chain which must extend completely around the wheel in order to be effective.

Having thus fully described my invention, what I claim as new and desire to secure by Letters Patent, is:—

An anti-skid chain comprising lateral chains adapted to extend around the rim of a wheel, cross chains connecting the lateral chains, a plurality of arcuate metallic tread plates located between a pair of the cross chains, anti-skidding means located on the face of each plate, diagonal chains extending from each corner of each plate, and a snap hook on one end of each of said chains to connect it to the lateral chains.

In testimony whereof I affix my signature.

CHARLES M. SMITH.